United States Patent Office 3,214,180
Patented Oct. 26, 1965

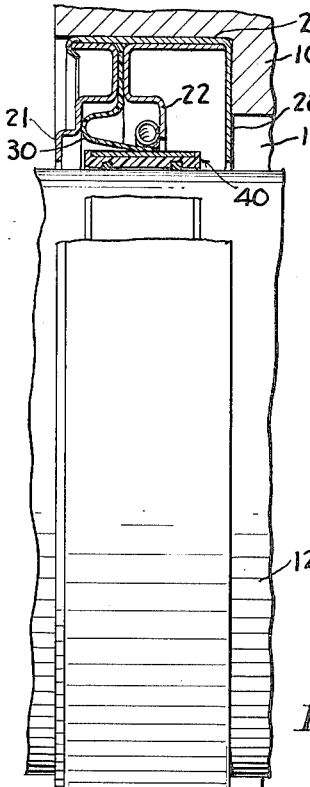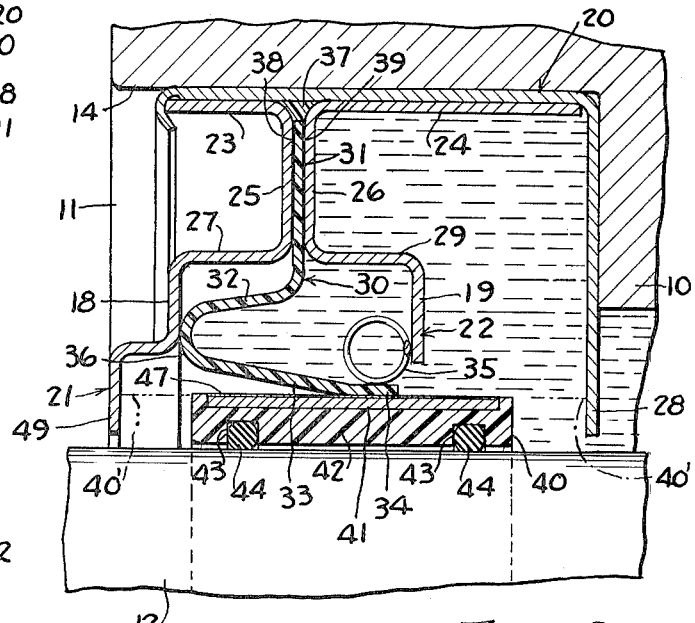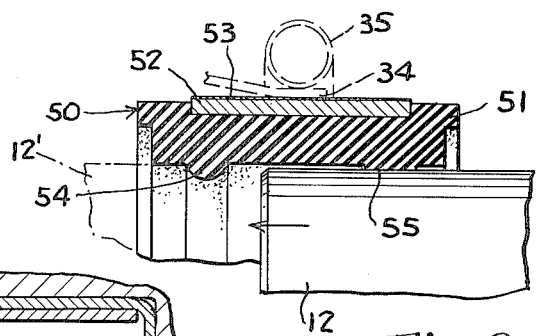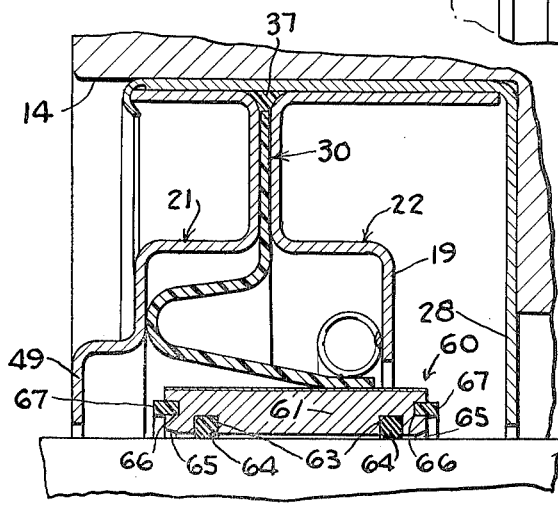

3,214,180
UNITIZED SHAFT SEAL ASSOCIATED WITH
A WEAR RING
Raymond A. Hudson, Ann Arbor, and David L. Walchle,
Milan, Mich., assignors to The Mather Company, Toledo, Ohio, a corporation of Ohio
Filed Mar. 27, 1963, Ser. No. 268,354
12 Claims. (Cl. 277—37)

This invention relates to seals for liquids such as oil to prevent leakage thereof from chambers containing the same and having rotatable shafts or other movable or rotatable members passing through the walls of said chambers, providing opportunities for the liquid to leak out.

One of the objects of the present invention is to provide a self-contained oil seal which is so constructed that the sealing lip of a diaphragm or other sealing element does not bear directly on the surface of the shaft which it seals but on the surface of a separable and replaceable annular member or sleeve sealing mounted on such shaft for movements therewith.

Another object of the invention is to provide a sealing device of the nature specified in the preceding paragraph, with such separable annular member being assembled prior to installation with the sealing device and mounted on the shaft only in the process of installing the seal in place.

A further object of the present invention is to provide an oil seal of the character specified above which also has all of the advantages attainable with a sealing diaphragm made of tetrafluoroethylene resin.

A still further object of the present invention is to provide an improved oil seal for a rotatable shaft including a special member to be mounted on the shaft to provide one of the surfaces in sliding contact, with the other such surface being provided by the sealing diaphragm, with such surfaces being in contact under controlled pressure and through a much greater area than in conventional seals, thus creating, without increasing friction, greatly increased and controlled resistance to liquid flow between the surfaces in sliding contact.

A still further object of the present invention is to provide an improved oil seal whereby only one of the surfaces in sliding contact is originally made of tetrafluoroethylene resin but in which after a short period of operation both surfaces in sliding contact acquire characteristics of sliding of one tetrafluoroethylene resin surface on another tetrafluoroethylene resin surface, thus giving the advantages of such a condition.

A still further object of the present invention is to provide an improved oil seal for a movable member such as a rotatable shaft, which seal provides for relative movement between the seal and the shaft longitudinally of the shaft through a relatively large distance without affecting operative positions of the sealing parts.

A still further object of the present invention is to provide an improved oil seal including a separate member attachable to the shaft to provide the movable surface in sliding contact cooperating to effect sealing with the stationary sealing diaphragm made of resin material, means being provided whereby relative sliding of such member and the seal in the direction longitudinally of the shaft does not disturb the predetermined positions of the sealing parts.

A still further object of the present invention is to provide an improved oil seal with the use of which the necessity of machining shafts to precise dimensions or providing fine finish on the shaft surfaces by grinding or polishing is eliminated, thus reducing very materially the cost of making such shafts or similar members.

A still further object of the present invention is to provide a member having thereon one of the surfaces in sliding contact with such surface including resin retaining pockets.

A still further object of the present invention is to provide an oil seal for rotatable shafts of relatively large diameters and subject in operation to axial movements through a relatively large distance such as occurring in operation of railroad car axles.

Further objects and advantages of this invention will be apparent from the following description and appended claims, reference being had to the accompanying drawings forming a part of this specification, wherein like reference characters designate corresponding parts in the several views.

FIG. 1 is a veiw partly in section showing an oil seal embodying the present invention and installed at a shaft.

FIG. 2 is a view showing on a larger scale the portion of FIG. 1 shown in section.

FIG. 3 is a fragmentary sectional view showing a modified construction of a replaceable sleeve.

FIG. 4 is a view similar in part to FIG. 2 but showing another modification.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of descripiton and not of limitation.

In the drawing there are shown, by way of example, an oil seal embodying the present invention with two additional modified constructions thereof. The embodiment illustrated in the drawing is adapted particularly, but not exclusively, as an oil seal for shafts subject to appreciable axial movement, as is the case with railroad car axles. Referring specifically to FIG. 1, the numeral 10 designates a wall in which there is formed an aperture 11 leading into an oil chamber, not shown. A shaft 12 is passed through the aperture 11, being centrally fixed therein in a suitable bearing, not shown. In order to prevent leakage of oil through the aperture 11 around the shaft 12, a sealing device or oil seal, generally designated by the numeral 13, is operatively mounted in a nest 14 provided in the wall 10.

The oil seal or sealing device 13 comprises an annular outer case 20 within which there are provided annular inner members 21 and 22 having outer flanges 23 and 24 fitted in the outer case 20. The case 20, and members 21 and 22 are preferably made of sheet metal, such as steel, copper or brass, by stamping operations. The finish of the outer surfaces of the case 20 as well as the finish of the inner walls within the nest 14 is such that when the seal is pressed fit into the nest, no leakage can take place between the walls of the net 14 and the outer surfaces of the case 20. Radially extending portions 25 and 26 of the members 21 and 22, respectively, merge smoothly and seamlessly into said flanges 23 and 24, respectively, and provide, in effect, a pinching groove holding therein the peripheral portion 31 of a sealing diaphragm generally designated by the numeral 30. The pinching flange 25 of the member 21 merges smoothly and seamlessly into a tubular flange 27 which, in turn, merges with a radially extending retaining flange 18. Similarly, the pinching flange or portion 26 of the member 25 merges into the tubular flange 29 which, in turn, merges with the radial retaining flange 19.

The peripheral portion 31 of the sealing diaphragm 30 merges seamlessly and smoothly into the shorter leg 32 of a U-shaped convolution, the longer leg 33 of which extends toward the oil chamber and is stretched in the process of installation over the sleeve 40 to provide a sealing lip or hoop portion 34. A garter spring 35 embraces the sealing hoop portion 34, holding it down to the surface of the metal band 41. The connecting portion 36 of the U-shaped convolution bears against the radial flange or wall 18 for support. The radial flange 19 is contacted by the spring 35 in the extreme position thereof and serves as a stop therefor to prevent said spring from sliding off or rolling off the sealing hoop portion 34.

In order to prevent leakage between the inner surfaces of the case 20 and the outer peripheral surfaces of the members 21 and 22, at the peripheral flanges 23 and 24, the outside diameter of the diaphragm 30 is made smaller than the inside diameter of the outer case 20 to provide a clearance space 37. Said space is filled with suitable resin cast therein to seal the path between said metal surfaces. We prefer to use as a filler an epoxy bonding agent which also operates to bond the diaphragm to the surfaces of flanges 25 and 26, as indicated by heavy lines 38 and 39. Making the seal diaphragm 30 of a smaller outside diameter than the inside diameter of the case 20 has the additional advantage of making a diaphragm of a certain outer diameter suitable for use in seals having outer cases of different diameters.

The replaceable wearing sleeve is of an articulated construction and is generally designated by the numeral 40. The body 42 of said replaceable sleeve 40 is made of a suitable plastic material such as "Delrin," preferably by molding in order that a metal band 41 may be molded into the body 42 as a metal insert in the process of molding the same. On the undersurface of the body 42 there are provided two or more grooves 43 in which are fitted resilient rings 44. Said rings are made preferably of oil resisting rubber or rubber-like material and may be of a circular cross section. The rings 44 are compressed in the process of inserting the shaft 12 through the seal and, therefore, in their operative position they are somewhat distorted in their circular cross section. Said rings 44 seal the oil path at the outer surfaces of the shaft 12 as well as the surfaces of the grooves 43.

The thickness of the metal band 41 generally depends on the size of the seal. For a railroad car axle, having a journal of 6.500" dia., a metal band of $\frac{1}{16}$" thick gives good results. The thickness of the diaphragm may be $\frac{1}{32}$"–$\frac{1}{16}$".

The working surface 47 of the metal band 41 is provided with a multitude of minute pockets. Such pockets may be provided with the aid of photoengraving process to give approximately 160–180 pockets or indentations per square inch. By virtue of such an expedient the working surface 47 in places contacted by the sealing hoop section 34 becomes filled, after a short period of operation, with the material of the sealing diaphragm 30, in the present embodiment tetrafluoroethylene resin, imparting to such surface superior anti-friction properties. At the same time the action of the band surface on the hoop portion 34 smoothens any irregularities that may be present therein greatly improving the contact between the surfaces. After some further operation, the mating surfaces in sliding contact acquire superior anti-friction and sealing characteristics and preserve such characteristics over exceedingly long periods of time. Another method of producing a similarly advantageous surface on the band 41 is to deposit thereon a layer of porous medium such as titanium oxide. With the use of such surfaces, the pores of the layer become filled with resin, producing similar advantageous anti-friction surfaces.

The width of the band 41 is made sufficient to allow the sleeve 40 to move with the shaft 12 in the axial direction for a predetermined distance without the sealing hoop section 34 losing contact with the anti-friction surface 47 of the band 41. In railroad axles, axial movement of $\frac{3}{8}$"–$\frac{1}{2}$" must be provided for in the seal. In accordance with the invention, the sleeve 40 is located on the shaft 12 in such a manner that when the shaft 12 is midway between its extreme positions indicated in phantom lines 40' in FIG. 2, the sealing hoop section 34 of the sealing diaphragm is in contact with the central portion of the band 41. By virtue of such a construction the shaft 12 can move axially within the predetermined limits without the replaceable wearing sleeve 40 striking the wall 28 of the member 20 or the depending flange 49 of the member 21 provided to protect the sealing surface from dirt and dust. There is sufficient clearance for the sleeve in the extreme positions thereof.

FIG. 3 shows a replaceable wearing sleeve of a modified construction, with the garter spring and the hoop section 34 being indicated thereat in phantom lines. The separable wearing sleeve generally designated by the numeral 50, comprises a ring shaped body 51 made of resilient material, such as rubber, and provided in its outer peripheral surface with a wide shallow groove. In the groove there is fitted a metal band 52 provided with anti-friction surface 53 in a manner such as described above. The inner peripheral surfaces of the body 51 are provided with two beads 54 and 55. The beads 54 and 55 adapt the sleeve for sealingly mounting on shafts of different diameters. Furthermore, when the sleeve provided with such beads is mounted on a shaft, the beads 54 produce greater localized pressure on the shaft surfaces than that are producable by flat surfaces, and thus create a better seal between the shaft 12 and the body 51 than could otherwise be attained. In FIG. 3, the shaft 12 is shown only partly inserted into the sleeve, with the bead 55 already in contact with the shaft 12 and resiliently distorted thereon, while the bead 54 still retains its free half-circular cross section until the shaft is inserted into its dotted line position 12'.

FIG. 4 illustrates a seal construction similar to that shown in FIGS. 1 and 2 but including a replaceable wearing sleeve of a still further modified construction. One of the particular advantages of this construction is the reduced cost of its manufacturing without sacrificing any of its functional advantages. Accordingly, this construction may be preferable under many conditions. The parts of the seal which remain stationary in operation, i.e., the parts connected or secured to the wall 14 of the nest, may in this construction be identical with those of the construction shown in FIGS. 1 and 2. Accordingly, the same designating numerals are applied to such corresponding parts, and this portion of the construction need not be described in detail.

The replaceable wearing sleeve generally designated by the numeral 60 is also of an articulated construction. It comprises a body 61 of a ring or hollow cylindrical shape; it is made of cast iron and machined. The inner diameter of the ring body 61 is made somewhat larger than the outer diameter of the shaft 12. In consequence thereof in the installed position of the ring body 61 there is clearance between the inner surfaces of said ring body 61 and the outer surfaces of the shaft 12. In order to seal this clearance space and to prevent leakage of oil between said surfaces there are provided in the inner surfaces of the ring body 61 two grooves 63 adapted to receive sealing rubber rings 64 similar in their construction and operation to rings 44 of the construction shown in FIG. 2. The inner edges of the ring body 61 are beveled, as shown at 65, in order to facilitate insertion of shaft 12 through the sleeve 60.

In the end surfaces of the body 61 there are provided grooves 66 carrying anti-friction rings 67. The rings 67 are made preferably of tetrafluoroethylene resin similarly to the sealing diaphragm 30. The purpose of the provision of said rings 67 is to reduce to a minimum the friction between the flange 49 or flange 28 of the members 21 and 22, respectively, should the shaft 12 carrying the sleeve 60 cause, in its axial movements, contact between the ends of the sleeve 60 and one of said flanges, producing a condition of surfaces under sliding contact due to rotation of the sleeve 60 with the shaft 12. It will be understood that under such conditions the construction described above operates to eliminate excessive pressure on said flanges by the sleeve 60 and, therefore, excessive friction thereat irrespective of the materials of the contacting surfaces. Such operation is attained by the rubber rings 64 of the sleeve 60 moving on the shaft 12, thus preventing exertion of excessive forces on the flanges 49 and 28, and providing for self-adjustment of the sleeve 60 in a proper position on the shaft 12. It should be noted also that such movements do not impair the sealing function of the rings 64.

The use of ring body 61 made of cast iron has the advantage of eliminating for many applications the necessity of providing the metal band, such as the band 41 of the construction of FIG. 2. Furthermore, under many conditions it also eliminates the necessity of providing a special outer wearing surface on the body 61 to include a multitude of minute pockets. The latter advantage is inherently possessed by the surfaces of the body 61 since cast iron, both in its usual cast form or in the form of malleable iron, includes such pockets filled with graphite. Therefore, after a short period of running contact between the cast iron and the sealing diaphragm 30, such pockets become filled with the mixture of resin and graphite producing an extremely advantageous anti-friction condition.

An important advantage of the construction illustrated in FIG. 4 results from the volume of metal, namely, cast iron, forming the metal member in contact with the sealing diaphragm and a relatively wide area of surface of this member in contact with the oil. In operation, should some heat be generated between the surfaces in sliding contact, such heat will be absorbed by the cast iron body 61. A large portion of it is running in oil exerting rubbing action on the sleeve. Such a condition is very conducive to proper heat transfer and, therefore, to dissipation of such heat before it reaches an undesirably high degree. In this respect the construction of FIG. 4 has an advantage over the constructions of FIGS. 2 and 3 where the volume of the metal is relatively small and such metal is isolated by the plastic body 42 or the rubber body 51. In the position of the shaft where the sealing hoop section is close to the edge of the metal band running in the oil chamber, the area of contact between the metal and the oil may not be sufficient for effective heat transfer. Therefore, in applications where temperature rise is expected, the use of the construction of FIG. 4 may be preferable.

It will be understood that the parts of the construction disclosed above and described as made of rubber or rubber-like materials are made of materials of the class of oil resisting rubber-like materials, a number of which are available on the market. One such material known under the name of "Buna" rubber gives very satisfactory results.

In accordance with the invention, the replaceable wearing sleeve, such as 40, 50 or 60, is loosely assembled within the seal, and the seal is supplied to the customer with such sleeve. For installation, the sleeve is mounted on the shaft by inserting the shaft through the seal in the process of installation. Depending on the nature of the construction of the device including a shaft such as 12, the seal may be inserted first in the nest 14 and the shaft 12 passed through the sleeve thereafter. In some cases it may be more advantageous to insert the shaft such as 12 through the seal first, and thereupon install such assembly in place.

It will be understood that the invention disclosed above is not limited to rotatable shafts or to sealing only oil but is applicable with success to sealing other liquids around rotatable or otherwise movable members passed through the walls of the chambers containing such liquids.

By virtue of the above disclosed construction, the object of the invention listed above and numerous additional advantages are attained.

We claim:

1. In a sealing device having a sealing diaphragm for a rotatable shaft passing through an aperture in a wall having liquid on one of its sides and subject to appreciable axial movements in said wall, said device intended to prevent passage of the liquid to the other side of the wall through said aperture both between stationary contacting surfaces as well as between surfaces in sliding contact, a replaceable wearing sleeve mounted on said shaft to have its inner surface in stationary sealing contact with said shaft and its outer surface providing a surface in sliding contact with the sealing diaphragm, said wearing sleeve comprising a metal body of a hollow cylindrical shape having inside diameter larger than the outside diameter of said shaft and provided in its inner surface with at least one groove adapted to receive a sealing ring, a sealing ring made of a rubber-like material lodged in said groove and adapted when the sleeve is mounted in the shaft to be in substantially stationary sealing contact with the surfaces of said shaft and walls of said groove, the outer surface of said body providing a surface to be in sliding sealing contact with the sealing diaphragm, grooves provided in both end surfaces of said body, and anti-friction rings carried in said end grooves.

2. In a sealing device having a sealing diaphragm for a rotatable shaft passing through an aperture in a wall having liquid on one of its sides and subject to appreciable axial movements in said wall, said device intended to prevent passage of the liquid to the other side of the wall through said aperture both between stationary contacting surfaces as well as between surfaces in sliding contact, a replaceable wearing sleeve mounted on said shaft to have its inner surface in stationary sealing contact with said shaft and its outer surface providing a surface in sliding contact with the sealing diaphragm, said wearing sleeve comprising a cast iron body of hollow cylindrical shape having inside diameter larger than the outside diameter of said shaft and provided in its inner surface with at least one groove adapted to receive a sealing ring, a sealing ring made of oil-resistant rubber-like material lodged in said groove and adapted, when the sleeve is mounted on the shaft, to be in substantially stationary sealing contact with the surface of said shaft, said cast iron body being provided at both its ends with end grooves, and anti-friction rings made of tetrafluoroethylene resin carried in said end grooves, the outer surface of said body providing a surface to be in sliding contact with the sealing diaphragm, said diaphragm being made of tetrafluoroethylene resin.

3. A sealing device for a rotatable shaft passing through an aperture in a wall having liquid on one of its sides and subject to appreciable axial movements, said device operating to prevent passage of the liquid to the other side of the wall through said aperture both between stationary contacting surfaces as well as between surfaces in sliding contact, an annular member assembled prior to installation with said sealing device and mounted on said shaft to rotate and to move axially therewith and providing a metal surface as one of the surfaces in sliding contact at which sealing is to be effected, said one surface being roughened and providing a multitude of resin receiving pockets, said sealing device comprising an annular case sealingly fitted into said aperture and sealing the liquid at the walls of said aperture, said annular case including a pair of spaced parallel annular flanges substantially bridging said aperture in and between said wall and said shaft including said annular member, anti-friction rings carried in the ends of said annular member for contact with said flanges, a sealing diaphragm provided within said case and sealingly connected thereto by its peripheral edges, said diaphragm having circular central opening for passing the shaft with said sleeve therethrough, said diaphragm having cross section providing outer peripheral portion for connecting the diaphragm to the case by the said peripheral edges of said portion, said portion extending transversely of the axis of the diaphragm, with the inner edges of said portion merging smoothly and seamlessly into one leg of a U- shaped convolution, with the other leg of said convolution being longer than said first leg and extending toward the liquid, said second leg having a sealing hoop portion formed on its free end to provide the other of said surfaces in sliding contact with said one surface and to fill said pockets therein with said resin from said hoop portion.

4. The sealing device as defined in claim 3 wherein said annular member includes grooves in its ends for carrying said anti-friction rings.

5. The sealing device defined in claim 3 wherein said anti-friction rings are made of tetrafluoroethylene resin.

6. The sealing device defined in claim 3, with the annular member assembled with the device prior to installation and mountable on the shaft to be sealed in the process of installation being of an articulated construction and including portions made, respectively, of metal and of rubber-like material and connected together to provide a unitary structure with the metal portion providing said rough metal surface to be in slidable contact with the sealing diaphragm, and the portion made of rubber-like material contacting the shaft for stationary sealing contact therewith under normal conditions but yieldingly slidable thereon when greater forces are applied.

7. The sealing device defined in claim 3, with the annular member assembled with the device prior to installation and mountable on the shaft to be sealed in the process of installation being of an articulated construction and including a ring-shaped body molded of a plastic material and having at least one groove on its inner surface, a sealing ring made of a rubber-like material and lodged in said groove to contact the outer surface of the shaft for sealing, and a metal band provided on said plastic body and forming said rough metal surface to be in slidable contact with the sealing diaphragm.

8. The sealing device defined in claim 3, with the annular member assembled with the device prior to installation and mountable on the shaft to be sealed in the process of installation being of an articulated construction and including portions made, respectively, of metal and of rubber-like material and connected together to provide a unitary structure, with the metal portion providing said rough metal surface to be in slidable contact with the sealing diaphragm, and the portion made of rubber-like material contacting the shaft for stationary sealing contact therewith under normal conditions but yieldingly slidable thereon when greater forces are applied, said metal surface being photo-engraved to provide said multitude of lubricant matter-retaining pockets thereon.

9. The sealing device defined in claim 3 including a garter spring embracing said hoop portion and pressing it against said one surface and being retained by one of said flanges, and said U-shaped convolution being retained by the other of said flanges.

10. The sealing device defined in claim 3 wherein said U-shaped convolution is retained by one of said flanges.

11. The sealing device defined in claim 3, with the annular member assembled with the device prior to installation and mountable on the shaft to be sealed in the process of installation being of an articulated construction and including portions made, respectively, of metal and of rubber-like material and connected together to provide a unitary structure, with the metal portion providing said rough metal surface to be in slidable contact with the sealing diaphragm, and the portion made of rubber-like material contacting the shaft for stationary sealing contact therewith under normal conditions but yieldingly slidable thereon when greater forces are applied, and a layer of porous medium deposited on said metal surface to provide said multitude of lubricant matter-retaining pockets thereon.

12. The sealing device defined in claim 11 wherein said layer of porous medium is titanium oxide deposited on said one surface.

References Cited by the Examiner
UNITED STATES PATENTS

| 1,068,329 | 7/31 | Derihon | 277—152 XR |
| 2,743,119 | 4/56 | Covert et al. | 277—170 |
| 2,750,212 | 6/56 | Skinner | 277—35 |
| 2,932,535 | 4/60 | Peickii et al. | 277—152 XR |
| 2,943,453 | 7/60 | Jonkers et al. | 277—65 |
| 3,011,814 | 12/61 | Rhoads et al. | 277—37 |
| 3,072,413 | 1/63 | Parks | 277—8 |

LEWIS J. LENNY, *Primary Examiner.*

SAMUEL ROTHBERG, EDWARD V. BENHAM,
*Examiners.*